United States Patent
Okuda et al.

(10) Patent No.: US 10,256,444 B2
(45) Date of Patent: Apr. 9, 2019

(54) ELECTRICITY STORAGE DEVICE

(71) Applicant: SANYO Electric Co., Ltd., Daito-shi, Osaka (JP)

(72) Inventors: Hiroyuki Okuda, Osaka (JP); Seiji Omura, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 94 days.

(21) Appl. No.: 15/306,284

(22) PCT Filed: Jun. 8, 2015

(86) PCT No.: PCT/JP2015/002852
§ 371 (c)(1),
(2) Date: Oct. 24, 2016

(87) PCT Pub. No.: WO2016/009586
PCT Pub. Date: Jan. 21, 2016

(65) Prior Publication Data
US 2017/0047566 A1 Feb. 16, 2017

(30) Foreign Application Priority Data
Jul. 15, 2014 (JP) .................. 2014-144843

(51) Int. Cl.
*H01M 4/36* (2006.01)
*H01M 2/12* (2006.01)
(Continued)

(52) U.S. Cl.
CPC ............ *H01M 2/1241* (2013.01); *H01G 2/14* (2013.01); *H01G 4/228* (2013.01); *H01G 9/12* (2013.01);
(Continued)

(58) Field of Classification Search
CPC .... H01M 2/12; H01M 2/1235; H01M 2/1241; H01M 2/20–2/208; H01M 2/22; H01M 2/24; H01M 2/30; H01M 2/305
See application file for complete search history.

(56) References Cited

U.S. PATENT DOCUMENTS 5,418,083 A 5/1995 Tamaki et al.
6,399,237 B1 * 6/2002 Souliac ............... H01M 2/0426
429/170
(Continued)

FOREIGN PATENT DOCUMENTS

CN 101212033 A 7/2008
CN 102150299 A 8/2011
(Continued)

OTHER PUBLICATIONS

International Search Report dated Sep. 8, 2015, issued in counterpart International Application No. PCT/JP2015/002852 (2 pages).
(Continued)

*Primary Examiner* — Scott J. Chmielecki
(74) *Attorney, Agent, or Firm* — Westerman, Hattori, Daniels & Adrian, LLP

(57) ABSTRACT

A battery pack includes a plurality of unit cells, each including a cylindrical battery case, and a connecting member (12) that connects the unit cells to each other. The battery case of each unit cell includes a bottom surface portion (30*b*) including a plurality of gas discharging sections (32) that open when an internal pressure of the unit cell reaches a predetermined pressure. The gas discharging sections (32) are separated from each other. The connecting member (12) is joined to a non-opening section (34) of the bottom surface portion (30*b*), the non-opening section (34) being disposed between the gas discharging sections (32).

5 Claims, 4 Drawing Sheets

(51) Int. Cl.

| | |
|---|---|
| *H01G 9/12* | (2006.01) |
| *H01G 11/10* | (2013.01) |
| *H01G 11/18* | (2013.01) |
| *H01G 2/14* | (2006.01) |
| *H01G 4/228* | (2006.01) |
| *H01G 11/28* | (2013.01) |
| *H01G 11/52* | (2013.01) |
| *H01G 11/68* | (2013.01) |
| *H01G 11/70* | (2013.01) |
| *H01G 11/76* | (2013.01) |
| *H01M 2/10* | (2006.01) |
| *H01M 2/02* | (2006.01) |
| *H01M 2/20* | (2006.01) |

(52) U.S. Cl.
CPC ............ *H01G 11/10* (2013.01); *H01G 11/18* (2013.01); *H01G 11/28* (2013.01); *H01G 11/52* (2013.01); *H01G 11/68* (2013.01); *H01G 11/70* (2013.01); *H01G 11/76* (2013.01); *H01M 2/022* (2013.01); *H01M 2/027* (2013.01); *H01M 2/105* (2013.01); *H01M 2/1016* (2013.01); *H01M 2/202* (2013.01); *H01M 2/023* (2013.01); *H01M 2200/20* (2013.01)

(56) References Cited

U.S. PATENT DOCUMENTS 8,900,733 B2 * 12/2014 Matsuura ............ H01M 2/1241
429/56
2007/0148533 A1 * 6/2007 Anglin ................ H01M 2/1241
429/56
2008/0248383 A1 * 10/2008 Kim .................... H01M 2/1241
429/156
2010/0009253 A1 * 1/2010 Mao ..................... B23K 33/006
429/164
2011/0117403 A1 * 5/2011 Hermann ................ H01M 2/00
429/94
2011/0123845 A1 * 5/2011 Kusama ............. H01M 2/1055
429/56
2011/0135975 A1 * 6/2011 Fuhr ....................... H01M 2/08
429/53
2012/0088128 A1 * 4/2012 Matsuura ........... H01M 2/1241
429/56

FOREIGN PATENT DOCUMENTS

| EP | 0 607 675 A1 | 7/1994 |
| JP | 6-333548 A | 12/1994 |
| JP | 7-134976 A | 5/1995 |
| JP | 10-92397 A | 4/1998 |
| JP | 2002-367583 A | 12/2002 |
| WO | 2010/137101 A1 | 12/2010 |

OTHER PUBLICATIONS

English translation of Search Report dated May 3, 2018, issued in counterpart Chinese Application No. 201580015457.2. (2 pages).

* cited by examiner

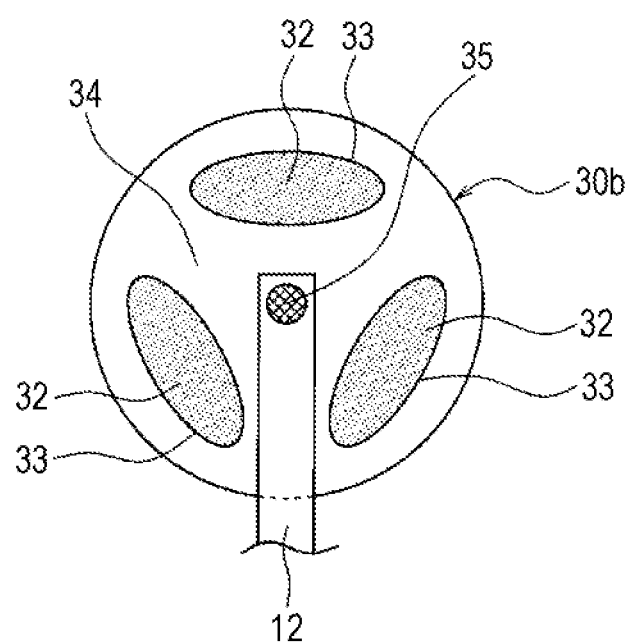

ELECTRICITY STORAGE DEVICE

TECHNICAL FIELD

The present invention relates to an electricity storage device including a plurality of storage cells that are connected to each other.

BACKGROUND ART

A known storage cell includes a gas discharging section (safety valve) that opens to prevent, for example, rupture of a cell case when an internal pressure of the storage cell increases due to heat generated by internal short circuiting or the like and reaches a predetermined pressure. For example, PTL 1 discloses a metal battery case including a gas discharging section provided on a bottom surface portion of the case. When the internal pressure of the battery reaches a predetermined pressure, a large opening is formed in the bottom surface portion of the metal battery case.

In the case where a plurality of storage cells are connected together to form an electricity storage device (for example, a battery pack), a connecting member is attached to the bottom surface portion of each cell case. In the storage cell of the related art disclosed in PTL 1, a connecting member is welded to the gas discharging section.

CITATION LIST

Patent Literature

PTL 1: Japanese Published Unexamined Patent Application No. 10-92397

SUMMARY OF INVENTION

Technical Problem

In the case where the connecting member is welded to the gas discharging section, there is a risk that the gas discharging section will be opened due to, for example, vibration or external pressure transmitted to the storage cell through the connecting member. For example, there is a risk that the gas discharging section will be opened during a tensile strength test for measuring a weld strength of the connecting member. When the internal pressure of the cell increases and reaches the predetermined pressure, the bottom surface portion of the cell case needs to be largely opened to enable smooth discharge of the gas.

Solution to Problem

An electricity storage device according to the present invention includes a plurality of storage cells, each including a cylindrical cell case; and a connecting member that connect the storage cells to each other. The cell case of each storage cell includes a bottom surface portion including a plurality of gas discharging sections that open when an internal pressure of the storage cell reaches a predetermined pressure, the gas discharging sections being separated from each other. The connecting member is joined to a non-opening section of the bottom surface portion of the cell case, the non-opening section being disposed between the gas discharging sections.

Advantageous Effects of Invention

According to the electricity storage device of the present invention, the bottom surface portion is prevented from being opened when a force is applied to the bottom surface portion of the cell case through the connecting member. In addition, in the electricity storage device according to the present invention, the bottom surface portion of the cell case of each storage cell is largely opened to enable smooth discharge of gas when the internal pressure of the storage cell increases and reaches a predetermined pressure.

BRIEF DESCRIPTION OF DRAWINGS

FIG. 5 is a bottom view of a battery pack according to another embodiment of the present invention.

DESCRIPTION OF EMBODIMENTS

Figure 1:
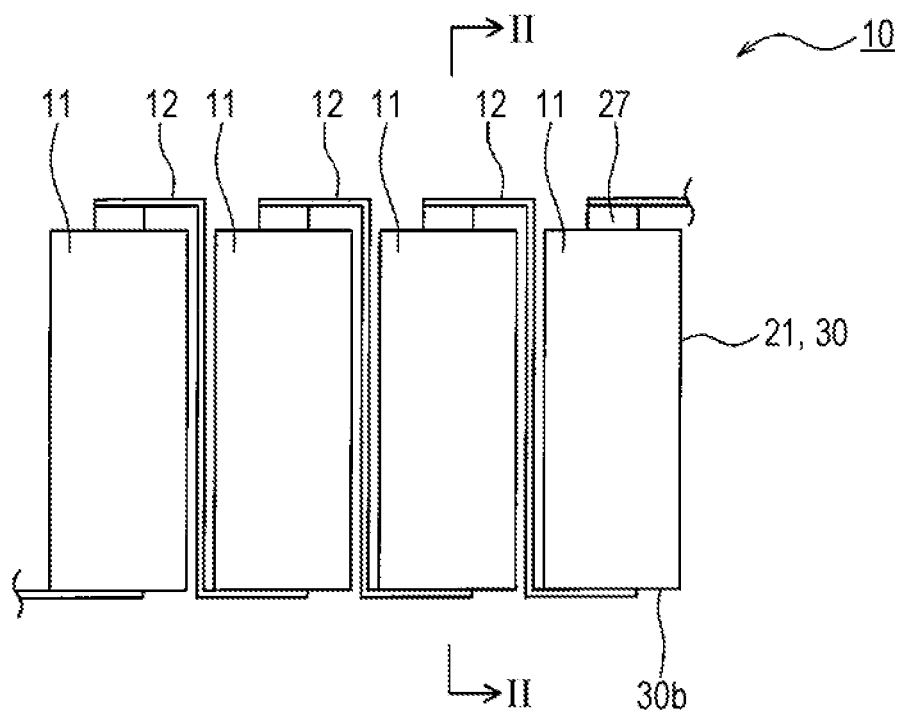
FIG. 1 is a diagram illustrating a battery pack according to an embodiment of the present invention.

An embodiment of the present invention will be described in detail with reference to the drawings.

The drawings referred to in the embodiment are schematic, and dimensional ratios, for example, of the components drawn in the drawings may differ from the actual dimensional ratios. The dimensional ratios, for example, are to be understood in consideration of the following description.

In the embodiment, a battery pack 10 including a plurality of unit cells 11 will be described as an example of a storage cell. However, an electricity storage device is not limited to this. A storage cell may instead be, for example, a capacitor. In the following description, the side of each unit cell 11 at which a sealing body 22 is provided is defined as the upper side, and the side of each unit cell 11 at which a bottom surface portion 30b of a case body 30 is provided is defined as the lower side.

The battery pack 10 according to the embodiment will be described with reference to FIGS. 1 to 3.

Figure 2:
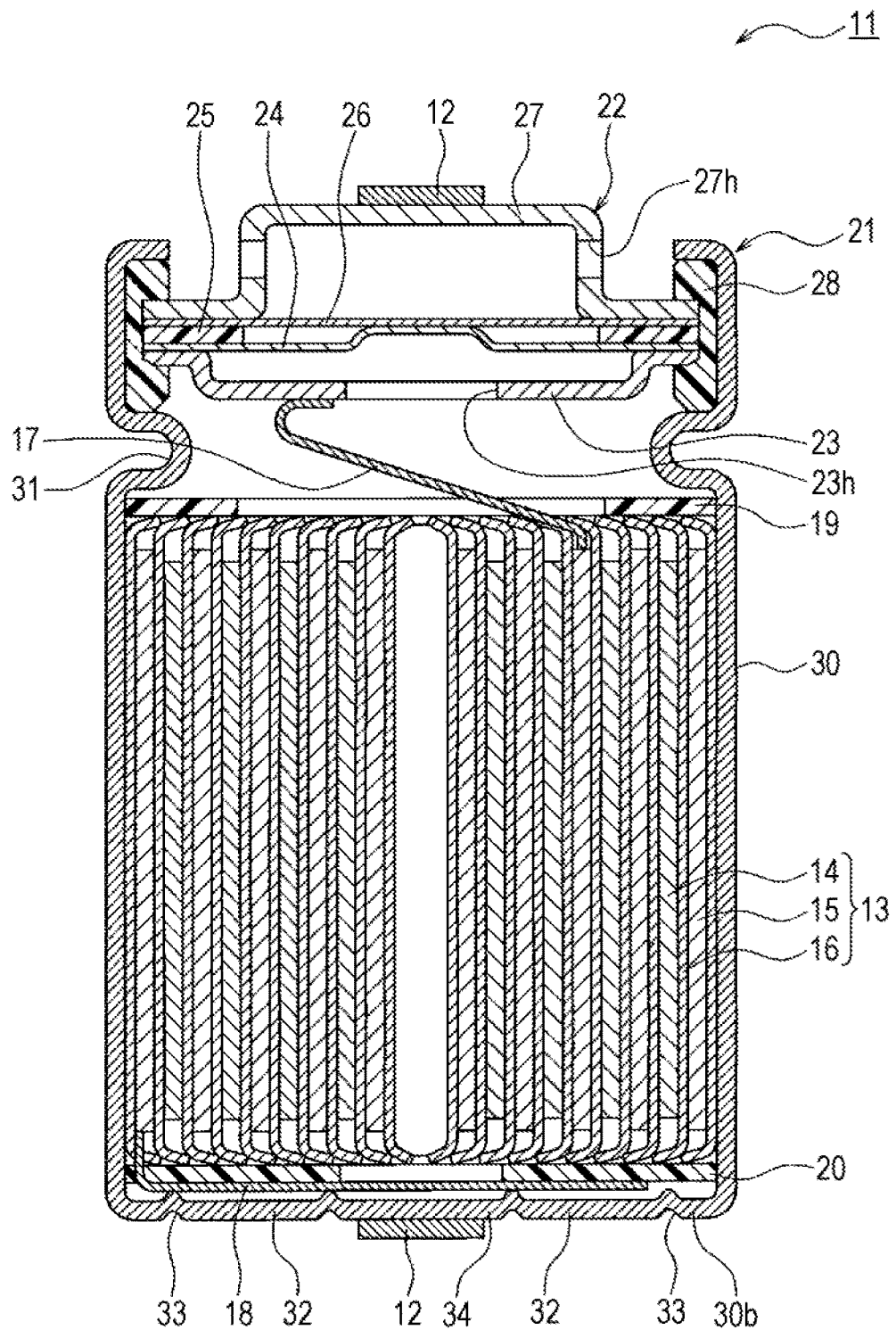
FIG. 2 is a sectional view of FIG. 1 taken along line II-II.

FIG. 1 is a schematic diagram of the battery pack 10, and FIG. 2 is a sectional view of FIG. 1 taken along line II-II.

As illustrated in FIGS. 1 and 2, the battery pack 10 includes the unit cells 11 and connecting members 12 that connect the unit cells 11. Each unit cell 11 includes a cylindrical battery case 21. As described in detail below, the battery case 21 includes a cap 27, which serves as a positive electrode terminal of the unit cell 11, and the case body 30, which serves as a negative electrode terminal of the unit cell 11.

In the example illustrated in FIG. 1, the unit cells 11 are linearly arranged so that the bottom surface portions 30b are oriented in the same direction. Each connecting member 12 connects the cap 27 of one of the adjacent unit cells 11 to the bottom surface portion 30b of the other of the adjacent unit cells 11. The connecting members 12 are, for example, thin long metal plates and extend in the vertical direction. Portions of the connecting members 12 near the top and bottom ends are bent in the opposite directions.

In the battery pack 10, the number and arrangement of the unit cells 11 and the shape and connection conditions of the connecting members 12 are not particularly limited. In any case, the connecting members 12 are joined to the bottom surface portions 30b of the battery cases 21 (case bodies 30). In the present embodiment, it is assumed that the connecting members 12 are welded to the bottom surface portions 30b.

However, the method for joining the connecting members 12 is not limited to this, and the connecting members 12 may instead be joined by using, for example, solder.

As illustrated in FIG. 2, each unit cell 11 includes an electrode body 13, an electrolyte (not shown), and a battery case 21 that accommodates the electrode body 13 and the electrolyte. The electrode body 13 has a winding structure in which a positive electrode 14, a negative electrode 15, and a separator 16 interposed between the positive electrode 14 and the negative electrode 15 are wound. The electrode body 13 includes a positive electrode lead 17 attached to the positive electrode 14 and a negative electrode lead 18 attached to the negative electrode 15.

Each unit cell 11 preferably includes insulating plates 19 and 20 disposed at the top and bottom of the electrode body 13. More specifically, the electrode body 13 is sandwiched by two insulating plates that are disposed at the top and bottom. The positive electrode lead 17 extends to the sealing body 22 through a through hole in the insulating plate 19. The negative electrode lead 18 extends to the bottom surface portion 30*b* of the case body 30 through a through hole in the insulating plate 20.

The positive electrode 14 includes a positive electrode current collector formed of, for example, metal foil, and positive electrode active material layers formed on the positive electrode current collector. The positive electrode current collector may be formed of, for example, foil of a metal that is stable in a potential range of the positive electrode 14, such as aluminum, or a film having a surface layer made of the metal. The positive electrode current collector is, for example, elongated-sheet-shaped, and has positive electrode active material layers on both sides thereof. The positive electrode active material layers preferably contain a conductive material and a binding material in addition to a positive electrode active material. The positive electrode active material is, for example, a lithium composite oxide.

The negative electrode 15 includes a negative electrode current collector formed of, for example, metal foil, and negative electrode active material layers formed on the negative electrode current collector. The negative electrode current collector may be formed of, for example, foil of a metal that is stable in a potential range of the negative electrode 15, such as copper or SUS, or a film having a surface layer made of the metal. The negative electrode current collector is, for example, elongated-sheet-shaped, and has negative electrode active material layers on both sides thereof. The negative electrode active material layers preferably contain a binding material in addition to a negative electrode active material. A conductive material may also be contained as necessary. The negative electrode active material is, for example, graphite.

The electrolyte is, for example, a nonaqueous electrolyte containing a nonaqueous solvent and an electrolyte salt, such as lithium salt, dissolved in the nonaqueous solvent. The nonaqueous electrolyte is not limited to a liquid electrolyte and may instead be a solid electrolyte including a gel polymer or the like. Examples of the nonaqueous solvent include esters, ethers, nitriles such as acetonitrile, amides such as dimethylformamide, and mixed solvents containing two or more of these materials. The nonaqueous solvent may contain a halogen-substituted product obtained by substituting hydrogen atoms in the solvent with halogen atoms such as fluorine atoms.

The battery case 21 is a cylindrical metal container that contains the electrode body 13 and the electrolyte. The battery case 21 includes the case body 30, which has a cylindrical shape with a bottom, and is structured such that the sealing body 22 closes the opening of the case body 30. In the present embodiment, the negative electrode lead 18 is connected to the inner surface of the bottom surface portion 30*b* of the case body 30 by welding or the like, so that the case body 30 serves as a negative electrode terminal. The positive electrode lead 17 is connected to the bottom surface of a filter 23 of the sealing body 22 by welding or the like, so that the cap 27 of the sealing body 22, which is electrically connected to the filter 23, serves as a positive electrode terminal. A gasket 28 is disposed between the sealing body 22 and the case body 30.

The sealing body 22 is preferably structured by stacking a plurality of components. In the present embodiment, the filter 23, a lower valve disc 24, an insulating plate 25, an upper valve disc 26, and the cap 27 are stacked together in that order from the bottom to form the sealing body 22. The components of the sealing body 22 are, for example, disc-shaped or ring-shaped. The lower valve disc 24 and the upper valve disc 26 each have a thin portion (not shown) that breaks when the internal pressure of the battery increases. As described above, the filter 23 is a component to which the positive electrode lead 17 is connected, and has a through hole 23*h*. The cap 27 is a component that is provided at the topmost (outermost) portion of the sealing body 22, and functions as a positive electrode terminal. The cap 27 has gas vent holes 27*h*.

The components of the sealing body 22 (excluding the insulating plate 25) are electrically connected to each other. More specifically, the filter 23 and the lower valve disc 24 are joined at the peripheries thereof, and the upper valve disc 26 and the cap 27 are also joined at the peripheries thereof. The lower valve disc 24 and the upper valve disc 26 are in contact with each other in central regions thereof, with the insulating plate 25 interposed between the peripheries thereof. For example, a central portion of the lower valve disc 24 bulges toward the upper valve disc 26, and is in contact with the bottom surface of the upper valve disc 26. The contacting portions of the valve discs are preferably joined by welding or the like.

The case body 30 preferably has a support portion 31 that is capable of receiving the sealing body 22. The support portion 31 is formed in an upper section of the case body 30, and is shaped such that a portion of the inner surface of the case body 30 projects inward. The upper surface of the inwardly projecting portion supports the sealing body 22. The support portion 31 preferably has an annular shape that extends in the circumferential direction of the case body 30. The support portion 31 is formed by, for example, pressing the side surface of the case body 30 from the outside.

In the present embodiment, when the internal pressure of the unit cell 11 increases, the thin portion of the lower valve disc 24 breaks so that the upper valve disc 26 bulges toward the cap 27 and moves away from the lower valve disc 24. Accordingly, the electrical connection between the lower valve disc 24 and the upper valve disc 26 breaks. When the internal pressure further increases, the thin portion of the upper valve disc 26 breaks and gas generated in the battery is discharged to the outside through the gas vent holes 27*h* in the cap 27.

The structure of the bottom surface portion 30*b* of the battery case 21 and the connection between the bottom surface portion 30*b* and the corresponding connecting member 12 will now be described with reference to FIG. 3. FIG. 3 is a bottom view of the battery pack 10, and illustrates the outer surface of the bottom surface portion 30*b* to which the connecting member 12 is welded.

Figure 3:
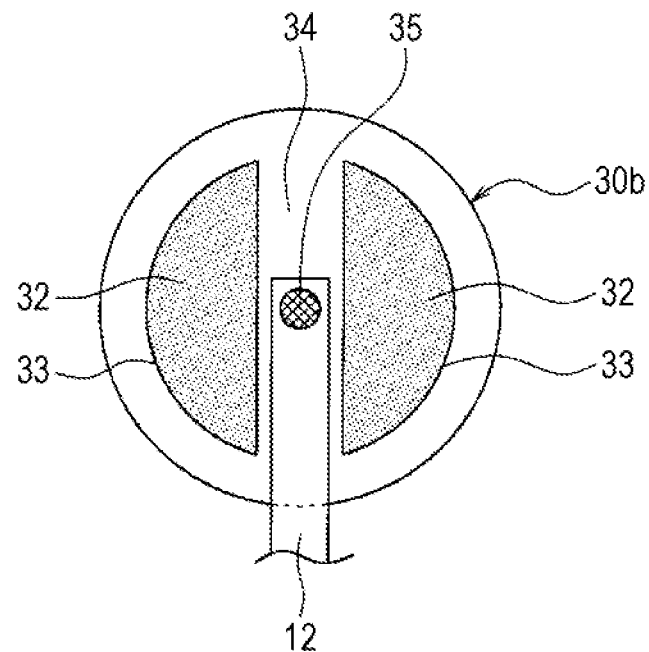
FIG. 3 is a bottom view of the battery pack according to the embodiment of the present invention.

As illustrated in FIG. 3, a plurality of gas discharging sections 32, which open when the internal pressure of the unit cell 11 reaches a predetermined pressure, are formed on the bottom surface portion 30b of the battery case 21 (case body 30) such that the gas discharging sections 32 are separated from each other. When the internal pressure of the unit cell 11 increases, the gas is discharged not only by the safety valve mechanism of the sealing body 22 but also through the gas discharging sections 32 on the bottom surface portion 30b. The number of gas discharging sections 32 may be 4 or more, but is preferably 2 or 3.

Loop-shaped grooves 33, for example, are formed in the bottom surface portion 30b of the case body 30, and sections surrounded by the grooves 33 serve as the gas discharging sections 32. The gas discharging sections 32 may instead be surrounded by grooves that are C-shaped in bottom view. However, to make the gas discharging sections 32 easy to break when the internal pressure increases, the gas discharging sections 32 are preferably surrounded by the grooves 33 along the entire peripheries thereof. The grooves 33 are, for example, formed in the outer surface of the bottom surface portion 30b so that recesses are formed in the outer surface and projections are formed in the inner surface (see FIG. 2). In the example illustrated in FIG. 3, two gas discharging sections 32 that are semicircular in bottom view are provided. The gas discharging sections 32 have the same shape and size.

The gas discharging sections 32 are preferably arranged in a region excluding the center of the bottom surface portion 30b (outer surface) so as to be line-symmetric about the straight line that passes through the center or rotationally symmetric about the center. In particular, the gas discharging sections 32 are preferably arranged so as to be rotationally symmetric about the center. In the example illustrated in FIG. 3, two gas discharging sections 32 are arranged such that linear portions of the semicircular gas discharging sections 32 are substantially parallel with each other with a predetermined distance therebetween. The bottom surface portion 30b has twofold symmetry about the center thereof. When the gas discharging sections 32 are evenly arranged around the center of the bottom surface portion 30b, the gas is prevented from, for example, being discharged from one side of the bottom surface portion 30b, making the electrode body 13 move so as to close the opening.

Preferably, the grooves 33, which define the gas discharging sections 32, have a greater depth in a region far from a welded section 35 of the connecting member 12 (arc-shaped portions in the present embodiment) than in a region close to the welded section 35 (linear portions in the present embodiment). Accordingly, the durability during welding of the connecting member 12 can be increased, and the gas discharging sections 32 are enabled to open smoothly so that the gas discharging performance is improved.

The total area of the gas discharging sections 32 (opening area in the state in which the gas discharging sections 32 are open) is preferably 20% to 60%, more preferably, 25% to 50%, of the area of the bottom surface portion 30b. The area of each gas discharging section 32 is preferably 7% to 30%, more preferably, 8% to 25%. When the areas of the gas discharging sections 32 are in these ranges, the bottom surface portion 30b has sufficient strength in normal use, and the gas can be appropriately discharged when the internal pressure of the unit cell 11 increases.

The connecting member 12 is welded to a non-opening section 34, which is disposed between the gas discharging sections 32, on the bottom surface portion 30b of the case body 30. The non-opening section 34 is a section of the bottom surface portion 30b that does not open when the internal pressure of the unit cell 11 reaches the predetermined pressure, and that is disposed between the gas discharging sections 32. When the connecting member 12 is welded to the non-opening section 34, even when a force is applied to the bottom surface portion 30b through the connecting member 12, the gas discharging sections 32 do not break and the bottom surface portion 30b is prevented from opening.

The connecting member 12 is preferably welded to the center of the bottom surface portion 30b. The connecting member 12 is, for example, spot-welded to the bottom surface portion 30b so that the welded section 35 is formed in a region including the center of the bottom surface portion 30b and the peripheral region around the center. A peripheral section of the bottom surface portion 30b, which is located further toward the outside of the bottom surface portion 30b than the gas discharging sections 32 are, also does not open at the predetermined pressure. However, the connecting member 12 is not welded to the peripheral section from the viewpoint of ensuring sufficient yield and weld strength.

The non-opening section 34 to which the connecting member 12 is welded is preferably wider than the connecting member 12. In the example illustrated in FIG. 3, the non-opening section 34, which is belt-shaped, is provided between the two gas discharging sections 32. The grooves 33 are not formed in the belt-shaped non-opening section 34, and both ends of the non-opening section 34 in the longitudinal direction are connected to the peripheral section of the bottom surface portion 30b. The non-opening section 34 is not easily bent because both ends thereof in the longitudinal direction are connected to the peripheral section, and therefore the bottom surface portion 30b does not break along the grooves 33 even when, for example, a force that pulls the connecting member 12 is applied to the non-opening section 34. The non-opening section 34 has a constant width over the entire length thereof in the longitudinal direction, and is wider than the connecting member 12.

The connecting member 12 is preferably arranged so as not to cover the gas discharging sections 32 on the bottom surface portion 30b. In the example illustrated in FIG. 3, the connecting member 12 has a width smaller than that of the non-opening section 34, and is arranged so as to extend in the longitudinal direction of the non-opening section 34 so that the connecting member 12 does not protrude from the non-opening section 34. Accordingly, when the gas discharging sections 32 open, the openings are not covered by the connecting member 12, and the gas can be smoothly discharged.

According to the battery pack 10 having the above-described structure, the bottom surface portion 30b of the case body 30 is prevented from being opened when a force is applied to the bottom surface portion 30b through the connecting member 12 during, for example, a tensile strength test for measuring the weld strength of the connecting member. When the internal pressure of the unit cell 11 increases, the bottom surface portion 30b is largely opened to enable the gas to be smoothly discharged.

The design of the above-described embodiment can be changed as appropriate as long as the object of the present invention can be achieved.

Figure 4:
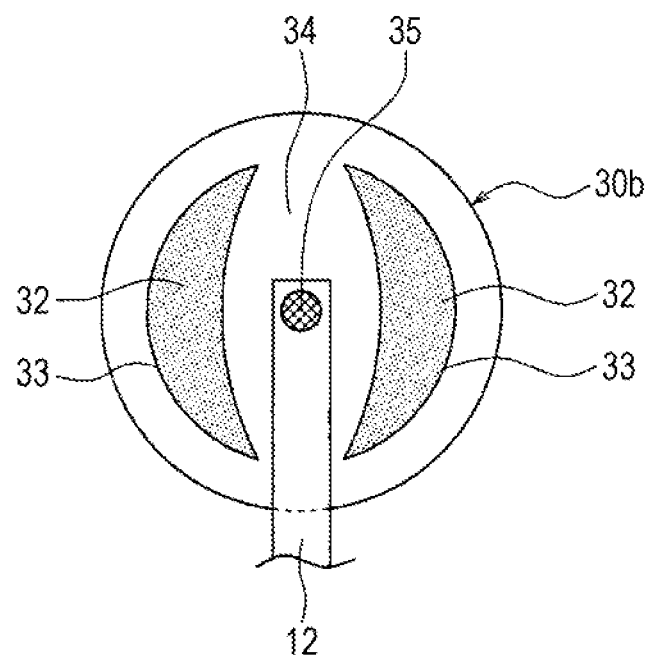
FIG. 4 is a bottom view of a battery pack according to another embodiment of the present invention.

FIGS. 4 and 5 illustrate examples of a design change (modifications).

In the example illustrated in FIG. 4, gas discharging sections 32, which are crescent-shaped in bottom view, are each defined by two arc-shaped grooves 33 that are convex toward the outside of the bottom surface portion 30b.

Similar to the above-described embodiment, the gas discharging sections 32 have the same shape and size, and are arranged so as to be rotationally symmetrical about the center of the bottom surface portion 30b. In the example illustrated in FIG. 4, the belt-shaped non-opening section 34, to which the connecting member 12 is welded, has a width that increases toward the center in the longitudinal direction. Therefore, the welded section 35 can be easily formed. The size of the distal end portion of the connecting member 12 can be increased in accordance with the increase in the width of the non-opening section 34 as long as the connecting member 12 does not protrude from the non-opening section 34.

In the example illustrated in FIG. 5, three gas discharging sections 32, which are elliptical in bottom view, are provided. Similar to the above-described embodiment, the gas discharging sections 32 have the same shape and size, and are arranged so as to be rotationally symmetric (so as to have threefold symmetry) about the center of the bottom surface portion 30b. In the example illustrated in FIG. 5, a non-opening section 34 that is Y-shaped (trifurcated) in bottom view are formed in the region surrounded by the three gas discharging sections 32. The Y-shaped non-opening section 34 is connected to the peripheral section of the bottom surface portion 30b at three locations without the gas discharging sections 32 disposed therebetween. Accordingly, the non-opening section 34 is less likely to be bent than in the above-described embodiment, and the bottom surface portion 30b does not break even when, for example, the connecting member 12 is strongly pulled.

In the above-described embodiment and modifications, the gas discharging sections 32 are formed as sections surrounded by the grooves 33. However, the gas discharging sections 32 may instead be formed as, for example, sections that are thinner than sections of the bottom surface portion 30b other than the gas discharging sections 32 (for example, the non-opening section 34).

INDUSTRIAL APPLICABILITY

The present invention is applicable to electricity storage devices.

REFERENCE SIGNS LIST 10 battery pack
11 unit cell
12 connecting member
13 electrode body
14 positive electrode
15 negative electrode
16 separator
17 positive electrode lead
18 negative electrode lead
19, 20, 25 insulating plate
21 battery case
22 sealing body
23 filter
23h through hole
24 lower valve disc
26 upper valve disc
27 cap
27h gas vent hole
28 gasket
30 case body
30b bottom surface portion
31 support portion
32 gas discharging section
33 groove
34 non-opening section
35 welded section

The invention claimed is:

1. An electricity storage device comprising:
a plurality of storage cells, each including a cylindrical cell case; and
a connecting member that connects the storage cells to each other,
wherein the cell case of each storage cell includes a bottom surface portion including a plurality of gas discharging sections that open when an internal pressure of the storage cell reaches a predetermined pressure, the gas discharging sections being separated from each other, and
wherein a distal end portion of the connecting member is joined to a non-opening section of the bottom surface portion of the cell case, the non-opening section being disposed between the gas discharging sections.

2. The electricity storage device according to claim 1,
wherein the number of gas discharging sections is 2 or 3, the gas discharging sections being arranged so as to be line-symmetric about a straight line that passes through a center of the bottom surface portion of the cell case or rotationally symmetric about the center of the bottom surface portion of the cell case, and
wherein the connecting member is joined to the center of the bottom surface portion of the cell case.

3. The electricity storage device according to claim 2, wherein the non-opening section, which is disposed between the gas discharging sections, is wider than the connecting member, and
wherein the connecting member is arranged so as not to cover the gas discharging sections.

4. The electricity storage device according to 1, wherein the bottom surface portion of the cell case includes loop-shaped grooves, and
wherein sections surrounded by the grooves serve as the gas discharging sections.

5. The electricity storage device according to claim 4, wherein the distal end portion of the connecting member is located at about a center of the non-opening section so as to be positioned between about middle points of the loop-shaped grooves.

* * * * *